(12) United States Patent
Jones, III et al.

(10) Patent No.: US 6,580,219 B1
(45) Date of Patent: Jun. 17, 2003

(54) ELECTRICAL CONTROL CIRCUIT FOR A SWITCHED LOAD

(75) Inventors: James L. Jones, III, White Lake, MI (US); Kenneth J. Russel, Westland, MI (US); Chidambarakrishnan L. Rajesh, Canton, MI (US); Belinda I. Ng, Troy, MI (US); Jade L. Huee, Novi, MI (US)

(73) Assignee: Yazaki North America, Canton, MI (US)

( * ) Notice: Subject to any disclaimer, the term of this patent is extended or adjusted under 35 U.S.C. 154(b) by 0 days.

(21) Appl. No.: 09/945,190

(22) Filed: Aug. 31, 2001

(51) Int. Cl.$^7$ ................................................. B60Q 1/26
(52) U.S. Cl. ............................ 315/80; 315/82; 315/83; 323/283; 323/285
(58) Field of Search ...................... 315/82, 83, 80, 315/77; 307/10.1, 10.8; 323/275, 277, 282, 283, 285

(56) References Cited

U.S. PATENT DOCUMENTS

| | | | |
|---|---|---|---|
| 4,408,157 A | 10/1983 | Beaubien | 324/62 |
| 4,574,266 A | 3/1986 | Valentine | 340/52 F |
| 4,578,591 A | * 3/1986 | Floyd et al. | 307/10.1 |
| 4,698,748 A | 10/1987 | Juzswik et al. | 364/200 |
| 5,049,805 A | 9/1991 | Celenza et al. | 323/285 |
| 5,231,344 A | * 7/1993 | Marumoto et al. | 322/14 |
| 5,773,935 A | * 6/1998 | Wagner et al. | 307/10.8 |
| 5,794,055 A | 8/1998 | Langer et al. | 395/750.01 |

* cited by examiner

Primary Examiner—Haissa Philogene
(74) Attorney, Agent, or Firm—Young & Basile P.C.

(57) ABSTRACT

An electrical control circuit for an automotive lamp module having an integrated ON/OFF switch to activate and deactivate the driver circuit associated with the lamp such that the driver circuit is only turned on when either the primary ON/OFF switch or a remote, door-ajar switch is closed. A microprocessor is used to respond to low-level current conditions indicative of a closed switch. A timer turns the driver OFF after a predetermined duration of continuous operation.

13 Claims, 2 Drawing Sheets

ELECTRICAL CONTROL CIRCUIT FOR A SWITCHED LOAD

FIELD OF THE INVENTION

The present invention relates to an electrical control circuit and, more particularly, to an electrical circuit for controlling the application of power to a load that is initially activated and deactivated by one or more switches.

BACKGROUND OF THE INVENTION

The use of solid state driver circuits to control the application of battery power to an automotive load device is becoming more and more prevalent. The load device is typically a lamp which may be integrated with an ON/OFF switch for primary control purposes. Such lamps may also be subject to secondary activation; for example, an automotive dome light may be turned ON and OFF both by the integrated ON/OFF switch and by a door ajar switch to light the interior of the automobile any time a door is opened.

An integrated switch cannot be wired as a separate input into an on-board microprocessor to provide a "wake-up" function. Therefore, it is required in such circuits to have the driver on even when no power to the load is required; i.e., when neither the integrated ON/OFF switch nor the door ajar switch is closed. Having the driver circuit, which typically controls a field effect transistor (FET), powered on at these times creates parasitic loss currents, an undesirable condition. The parasitic loss currents can exceed key-off load requirements for a vehicle.

SUMMARY OF THE INVENTION

The present invention addresses the problem described above by providing a driver circuit such as an FET which is normally OFF, and further providing a low power sense circuit connected to a controller to detect the closed switch condition and activate or "wake up" the driver circuit when full power is required. The invention can be applied to both high side and low side switching circuit designs and to loads, such as lamps, which are switched by both primary, integrated ON/OFF switches and remote switches such as door ajar switches. By monitoring switch position from the sense circuit, the controller activates the driver circuit only when a switch is closed. Thus, no parasitic current drain is produced when all control switches are open.

In the illustrated embodiments, the controller further includes a timer to determine how long a load has been activated. After a predetermined period of time has lapsed, the controller deactivates the driver circuit to shut off power to the load.

For example, if the switched load is a dome lamp, the controller can turn the lamp off after a predetermined period of time (e.g., ten minutes) even though the dome light switch or an associated door ajar switch remains closed. In this manner, the electrical control circuit can prevent vehicle battery drain when a load has been activated for a long period of time such as when a operator has left the vehicle with the dome light on or has failed to close a door.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
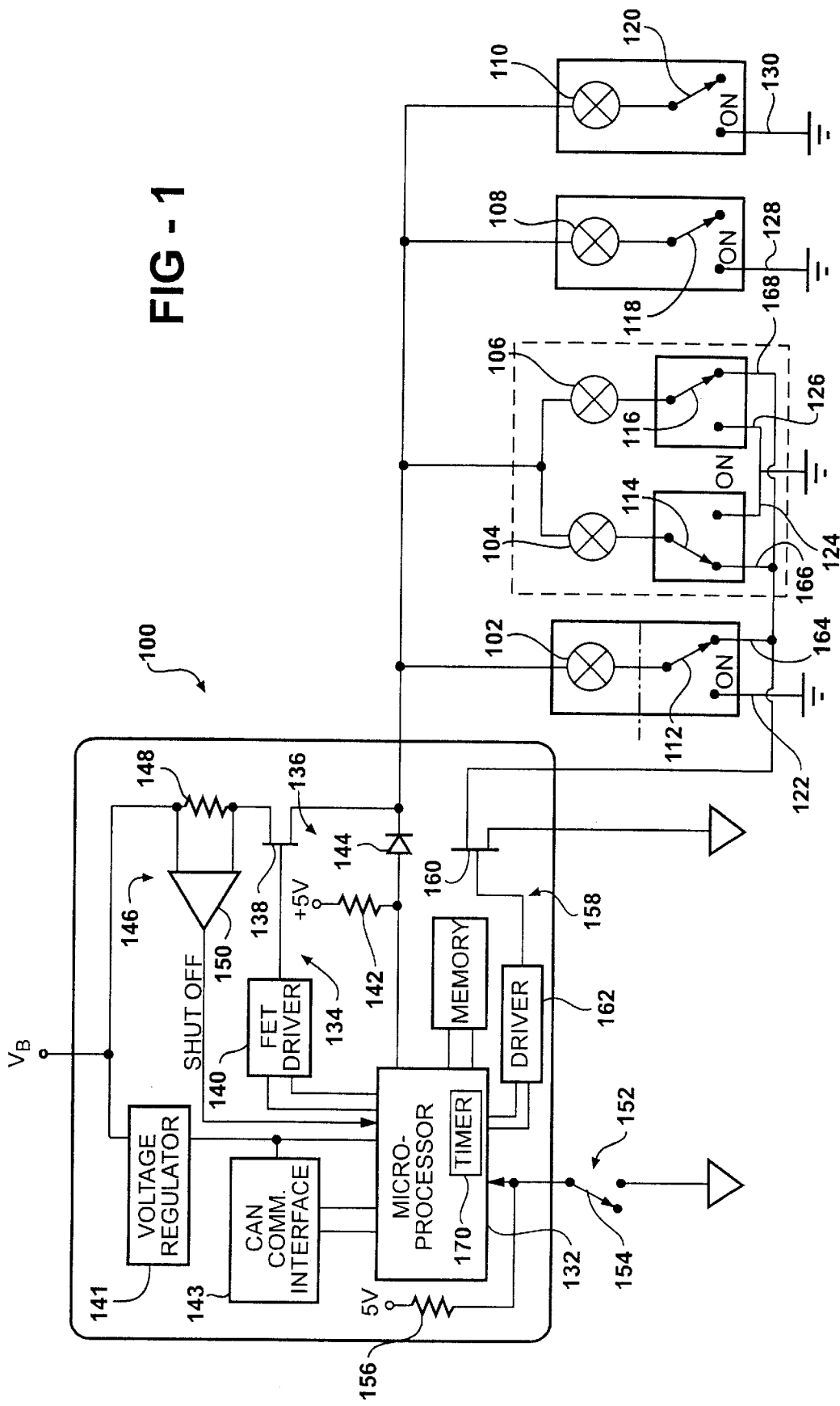
FIG. 1 is an electrical schematic of one embodiment of an electrical control circuit for controlling low side switched loads in accordance with the present invention.

FIG. 1 is an electrical schematic of an automotive electrical control circuit 100 for controlling low side switched dc lamps or, in other words, lamps that are grounded via a primary control switch which is typically physically proximate to the lamp and integrated into the lamp package. By way of example and not limitation, the low side switched loads include a dome lamp 102, two overhead console lamps 104 and 106, an underhood lamp 108, and a glove box lamp, 110. Lamps 102–110 are connected in electrical series with switches 112–120, respectively. A normally open contact 122–130 of each switch 112–120, respectively, is connected to ground.

The electrical control circuit 100 includes a controller including a microprocessor 132, a high side driver circuit 134, and a sense circuit 136. The high side driver circuit 134 includes an FET 138 operated by a driver 140. The high side FET driver 140 is controlled by, or activated and deactivated by, the microprocessor 132. When the high side FET driver 140 is activated, the high side FET 138 is closed or operated in an ON state and battery power ($V_B$) is supplied or switched ON to the lamps 102–110. When the high side FET driver 140 is deactivated, the high side FET 138 is open or operated in an OFF state and battery power ($V_B$) is disconnected or switched OFF to the lamps 102–110. Circuit 100 further includes a battery connector at $V_B$, a voltage regulator 141 and a computer interface 143.

The sense circuit 136 includes a resistor 142 and a forward biased diode 144. The sense circuit 136 is tapped between the high side FET 138 and the switched loads 102–110. The resistor 142 is pulled-up to +5 V to provide a first stage, low level current to any load which is turned ON by its associated switch via resistor 142 and diode 144. A signal from the sense circuit 136 indicating whether (1) any switch 112–120 is closed, or (2) all the switches 112–120 are open, is delivered as an input to the microprocessor 132 on line 145. A high voltage signal from the sense circuit 136 indicates all the switches 112–120 are open. A low voltage signal from the sense circuit 136 indicates at least one of the switches 112–120 is closed.

The electrical control circuit 100 also includes a current measuring circuit 146 having a shunt resistor 148 and a comparator 150. The shunt resistor 148 is connected in electrical series between the power source ($V_B$) and the high side FET 138. The comparator 150 is connected across the shunt resistor 148. The current measuring circuit 146 provides a signal to the microprocessor 132 indicating the amount of current flow through the high side FET 138 and the loads 102–110 that are switched to ground.

In the circuit of FIG. 1, all switches 112, 114, 116, 118 and 120 are normally closed. Under this condition there is no current flow through any of the lamps. If, for example, switch 112 is closed, a low current flows from the 5 volt source, through resistor 142, diode 144, lamp 102 and ground line 122. This current is insufficient to light the lamp 102 but is sufficient to provide a sense signal to microprocessor 132. The microprocessor is programmed to respond to this input to activate driver 140 and FET 138. This applies full battery power to lamp 102 to fully illuminate it.

Lamps 102, 104 and 106 may also be illuminated by a second, remote switch. A door ajar switch circuit 152, including a door ajar switch 154 and a pull-up resistor 156, is connected as a second input to the microprocessor 132. A high signal condition at this second input causes the microprocessor to activate a low side driver circuit 158 including an FET 160 operated by a driver 162. When the low side FET driver 162 is activated, the low side FET 160 is closed or operated in an ON state grounding all of the switches 112, 114 and 116 even though they are in the off position. It will be noted that all of switch contacts 164, 166 and 168 are connected to ground through FET 160 when turned ON. When the low side FET driver 162 is deactivated, the low side FET 160 is open or operated in an OFF state and the normally closed contact 164 of the dome lamp switch 112 as well as the normally closed contacts 166 and 168 of the overhead console switches 114 and 116, respectively, are open circuited.

During normal operation, each switch 112–120 is in the off position as shown in FIG. 1, the door ajar switch 154 is open, the high side FET 138 is nonconducting and all the lamps 102–110 are OFF. If any switch 112–120 is closed, a ground path is provided from the pull-up resistor 142 through the forward biased diode 144, the in-series lamp, and the closed switch to ground. For example, if the dome lamp switch 112 is closed, a ground path is provided from the pull-up resistor 142 through the forward biased diode 144, the dome lamp 102, and the closed dome lamp switch 112 to ground. When any switch 112–120 is closed, the voltage signal from the sense circuit 136, which is input to and monitored by the microprocessor 132, decreases from +5 V to a lower voltage. In response to the signal change from the sense circuit 136, the microprocessor 132 activates the high side FET driver 140. When the high side FET driver 140 is activated, the high side FET 138 is closed or operated in an ON state and battery power ($V_B$) is delivered to all the lamps 102–110 through the high side FET 138. Accordingly, any lamp 102–110 that is grounded is switched ON. In the example, the dome lamp 102 is switched ON.

When all the switches 112–120 are open, the ground path is opened, the diode 144 becomes reversed biased, the voltage signal from the sense circuit 136 increases to +5 V, and the signal from the current monitoring circuit 146 indicates zero current flow. In response to both the signal change from the sense circuit 136 and the lack of current flow through the shunt resistor 148, the microprocessor 132 deactivates the high side FET driver 140. When the high side FET driver 140 is deactivated, the high side FET 138 is open or operated in an OFF state. Battery power ($V_B$) to all the lamps 102–110 through the high side FET 138 is disconnected, thereby switching all the lamps 102–110 OFF.

Typically, it is desirable to have the dome lamp 102 and the overhead console lamps 104 and 106 ON when a vehicle door is opened. To accomplish this, the microprocessor 132 monitors the signal from the door ajar switch 154. When a door is opened, the door ajar switch 154 is closed. The voltage signal from the door ajar circuit 152 decreases from +5 V to a lower voltage. In response to the signal change from the door ajar circuit 152, the microprocessor 132 activates the low side FET driver 162. When the low side FET driver 162 is activated, the low side FET 160 is closed or operated in an ON state. Thus, the normally closed contact 164 of the dome lamp switch 112 and normally closed contacts 166 and 168 of the overhead console switches 114 and 116 respectively are grounded through the low side FET 160. While the low side driver circuit 158 provides a switched ground, the microprocessor 132 activates the high side driver circuit 134 to deliver battery power ($V_B$) to all the lamps 102–110 through the high side FET 138, thus switching the dome lamp 102 and the overhead console lamps 104 and 106 ON. In this manner, the high side driver circuit 134 is only activated by the microprocessor 132 when any one of the dome lamp switch 102, one of the two overhead console lamp switches 104 and 106, the underhood lamp switch 108, the glove box lamp switch 110, or the door ajar switch 154 is closed. Accordingly, the electrical control circuit 100 does not create a parasitic drain current by continuously operating the high side FET driver 140. Further, the electrical control circuit 100 is capable of controlling one or more low side switched loads that are enclosed in a preassembled and pre-wired module.

Optionally, the electrical control circuit 100 also includes a timer 170 for measuring either (1) the duration of a low voltage signal or, in other words, a "closed switch" signal from the sense circuit 136, or (2) the duration of high side driver circuit activation. For battery drain protection, the microprocessor 132 deactivates the high side driver circuit 134 in response to either (1) a measured low voltage or "closed switch" signal of a predetermined duration, or (2) a measured high side driver circuit activation of a predetermined duration. In this manner, the microprocessor 132 automatically deactivates a load after the load has remained activated or ON for a predetermined and unusually long period of time. For additional circuit overload protection, the microprocessor 132 automatically deactivates the high side driver circuit 134 when the signal from the current monitoring circuit 146 indicates that current flow through the shunt resistor 148 has exceeded a predetermined current level. In this manner, the electrical control circuit 100 protects from a direct short to ground condition. Accordingly, the electrical control circuit 100 provides battery drain protection and circuit overload protection.

Figure 2:
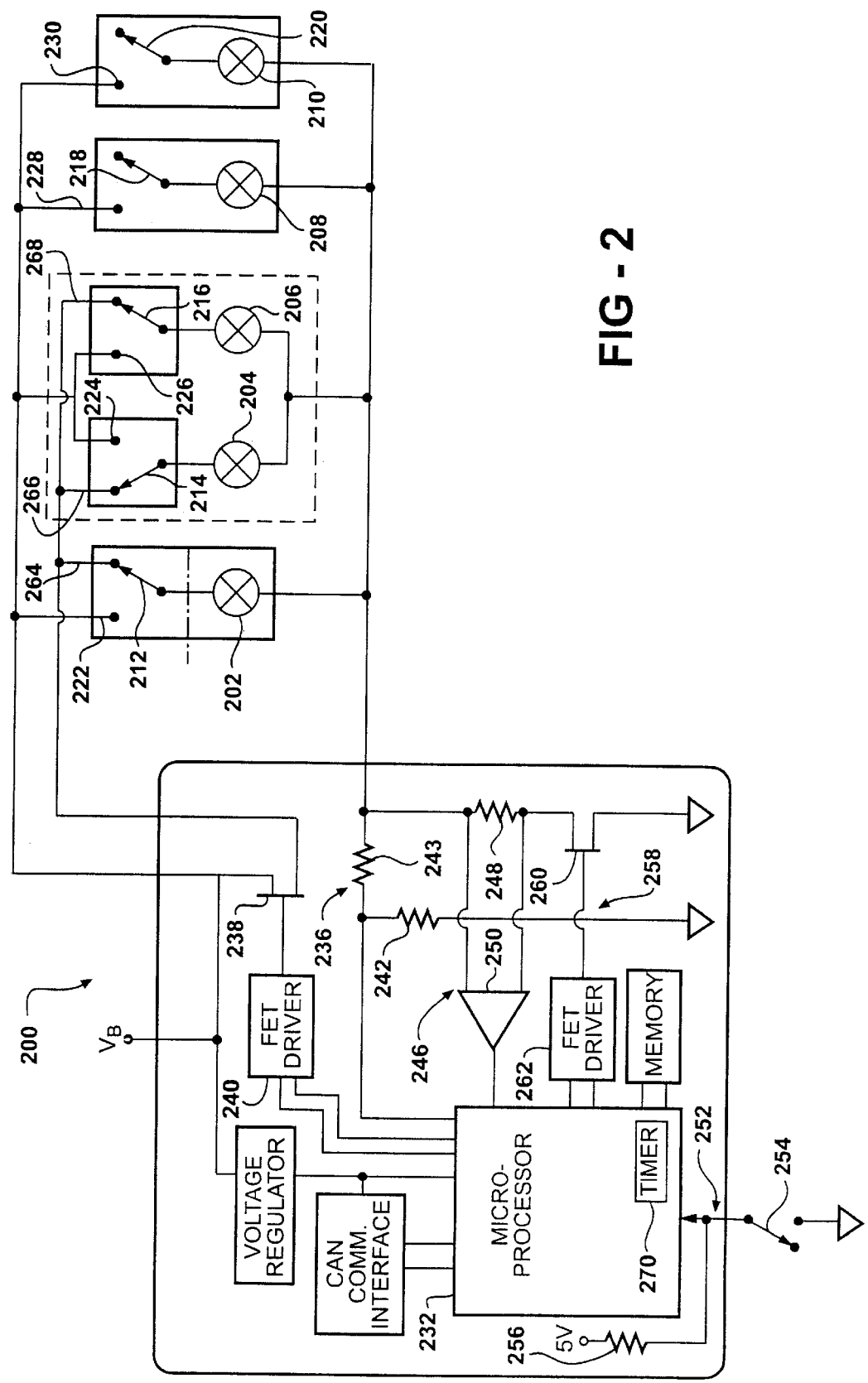
FIG. 2 is an electrical schematic of another embodiment of an electrical control circuit for controlling high side switched loads in accordance with the present invention.

FIG. 2 is an electrical schematic of another embodiment of an electrical control circuit 200 for controlling high side switched loads or, in other words, loads where the switch is on the powerside. For exemplary purposes only and not to limit the scope of the present invention, the high side switched loads include a dome lamp 202, two overhead console lamps 204 and 206, an underhood lamp 208, and a glove box lamp 210. One of ordinary skill in the art will recognize that the present invention can control any high side switched load and not only high side switched lamps or lights. Lamps 202–210 are connected in electrical series with switches 212–220, respectively. A normally open contact 222–230 of each switch 212220, respectively, is connected to a power source ($V_B$).

The electrical control circuit 200 includes a controller or microprocessor 232, a low side driver circuit 258, and a sense circuit 236. The low side driver circuit 258 includes an electrical switch 260 operated by a driver 262. Preferably, the electrical switch 260 is a Field Effect Transistor (FET) and the driver 262 is a FET driver as shown in FIG. 2. The low side FET driver 262 is controlled by, or activated and deactivated by, the microprocessor 232. When the low side FET driver 262 is activated, the low side FET 260 is closed or operated in an ON state, and the lamps 202–210 are grounded through the low side FET 260. When the low side FET driver 262 is deactivated, the low side FET 260 is open or operated in an OFF state, and the lamps 202–210 are open circuited by the low side FET 260.

The sense circuit 236 includes two resistors 242 and 243. One resistor, the first resistor 242, is connected to ground. The sense circuit 236 is tapped between the low side FET 260 and the switched loads 202–210 through the second resistor 243. A signal from the sense circuit 236, indicating whether (1) any switch 212–220 is closed, or (2) all the switches 212–220 are open, is monitored by the microprocessor 232. A low voltage signal from the sense circuit 236 indicates all the switches 212–220 are open. A high voltage signal from the sense circuit 236 indicates at least one of the switches 212–220 is closed.

The electrical control circuit 200 also includes a current measuring circuit 246 having a shunt resistor 248 and a comparator 250. The shunt resistor 248 is connected in electrical series between the sense circuit 236 and the low side FET 260. The comparator 250 is connected across the shunt resistor 248. The current measuring circuit 246 provides a signal to the microprocessor 232 indicating the amount of current flow through the low side FET 260 when any switch 212–220 is closed.

A door ajar switch circuit 252, including a door ajar switch 254 and a pull-up resistor 256, is also connected to the microprocessor 232. A signal from the door ajar circuit 252 indicating whether the door ajar switch 254 is open or closed is monitored by the microprocessor 232. A high voltage signal from the door ajar circuit 252 indicates the door ajar switch 254 is open. A low voltage signal from the door ajar circuit 252 indicates the door ajar switch 254 is closed.

The electrical control circuit 200 also includes a high side driver circuit 234. The high side driver circuit 234 includes an electrical switch 238 operated by a driver 240. Preferably, the electrical switch 238 is a Field Effect Transistor (FET) and the driver 240 is a FET driver as shown in FIG. 2. The high side FET driver 240 is controlled by, or activated and deactivated by, the microprocessor 232. When the high side FET driver 240 is activated, the high side FET 238 is closed or operated in an ON state. Also, a normally closed contact 264 of the dome lamp switch 212 as well as normally closed contacts 266 and 268 of the overhead console switches 214 and 216, respectively, are supplied battery power ($V_B$). When the high side FET driver 240 is deactivated, the high side FET 238 is open or operated in an OFF state. The normally closed contact 264 of the dome lamp switch 212 as well as the normally closed contacts 266 and 268 of the overhead console switches 214 and 216, respectively, are open circuited.

During normal operation, each switch 212–220 is open as shown in FIG. 2, the door ajar switch 254 is open, the low side FET 260 is open or operated in an OFF state, and all the lamps 202–210 are OFF. If any switch 212–220 is closed, battery power ($V_B$) is delivered through the closed switch and the in-series lamp to the second resistor 243 of the sense circuit 236. For example, if the dome lamp switch 212 is closed, battery power ($V_B$) is delivered through the closed dome lamp switch 212 and the dome lamp 202 to the second resistor 243 of the sense circuit 236. When any switch 212–220 is closed, the voltage signal from the sense circuit 236, which is input to and monitored by the microprocessor 232, increases to +5 V. In response to this signal change from the sense circuit 236, the microprocessor 232 activates the low side FET driver 262. When the low side FET driver 262 is activated, the low side FET 260 is closed or operated in an ON state. Thus, the lamps 202–210 are switched or connected to ground through the low side FET 260, and any lamp 202–210 that is powered is switched ON. In the example, the dome lamp 202 is switched ON.

When all the switches 212–220 are then opened, no power is delivered to any lamp 202–210, the voltage signal from the sense circuit 236 is 0 V, and the signal from the current monitoring circuit 246 indicates zero current flow. In response to both the signal change from the sense circuit 236 and the lack of current flow through the shunt resistor 248, the microprocessor 232 deactivates the low side FET driver 262. When the low side FET driver 262 is deactivated, the low side FET 260 is open or operated in an ON state and all the lamps 202–210 are disconnected from ground through the low side FET 260, thereby switching all the lamps 202–210 OFF.

Typically, it is desirable for the dome lamp 202 and the overhead console lamps 204 and 206 to be ON when a vehicle door is opened. To accomplish this, the microprocessor 232 monitors the signal from the door ajar switch 254. When a door is opened, the door ajar switch 254 is closed and the voltage signal from the door ajar circuit 252 decreases from +5 V to a lower voltage. In response to the signal change from the door ajar circuit 252, the microprocessor 232 activates the high side FET driver 240. When the high side FET driver 240 is activated, the high side FET 238 is closed or operated in an ON state. The normally closed contact 264 of the dome lamp switch 212 and normally closed contacts 266 and 268 of the overhead console switches 214 and 216, respectively, are supplied power ($V_B$) through the high side FET 238. While the high side driver circuit 234 provides switched power, the microprocessor 232 activates the low side driver circuit 258 to connect all the lamps 202–210 to ground through the low side FET 260, thus switching the dome lamp 202 and the overhead console lamps 204 and 206 ON. In this manner, the low side driver circuit 258 is only activated by the microprocessor 232 when any one of the dome lamp switch 212, one of the two overhead console lamp switches 214 and 216, the underhood lamp switch 218, the glove box lamp switch 220, or the door ajar switch 254 is closed. Accordingly, the electrical control circuit 200 does not create a parasitic drain current by continuously operating the low side FET driver 262. Further, the electrical control circuit 200 is capable of controlling one or more high side switched loads that are enclosed in a preassembled and pre-wired module.

Optionally, the electrical control circuit 200 also includes a timer 270 for measuring either (1) the duration of a high voltage signal or, in other words, a "closed switch" signal from the sense circuit 236, or (2) the duration of low side driver circuit activation. For battery drain protection, the microprocessor 232 deactivates the low side driver circuit 258 in response to either (1) a measured high voltage or "closed switch" signal of a predetermined duration, or (2) a measured low side driver circuit activation of a predetermined duration. In this manner, the microprocessor 232 automatically deactivates a load after the load has remained activated or ON for predetermined and unusually long period of time. For additional circuit overload protection, the microprocessor 232 automatically deactivates the low side driver circuit 258 when the signal from the current monitoring circuit 246 indicates that current flow through the shunt resistor 248 has exceeded a predetermined high level of current. In this manner, the electrical control circuit 200 protects from a direct short to ground condition. Accordingly, the electrical control circuit 200 provides battery drain protection and circuit overload protection.

It will be understood from the foregoing description that in both embodiments the driver FET for the associated loads is non-conducting until a load activation switch is closed. When that happens, a sense circuit is made conductive for low level current, and the sensing of this current provides an input to a microprocessor which turns the driver FET on. In both cases, a second switch can activate the load independently of the FET driver switch even if the primary switch is in the off position.

It will be further understood that while a programmable microprocessor or microcontroller is preferred, hard-wired control circuits may also be employed.

What is claimed is:

1. A control circuit for connecting an automotive load device having an integrated ON/OFF switch to a source of electrical power comprising:
   a driver circuit connected in series with the load device and source for controlling activation of the load;
   a sense circuit connected between the load and the driver circuit for providing a low level sense signal when the switch is in the ON position;
   a controller having an input connected to receive the sense signal and an output connected to the driver circuit to activate the driver circuit in response to the signal from the sense circuit; and
   timer means for indicating the duration of the sense signal to the controller, wherein the controller deactivates the driver circuit whenever the sense signal persists for more than a predetermined time.

2. The electrical control circuit of claim 1 wherein the driver circuit includes a driver and a field effect transistor.

3. An electrical control circuit for an electrical load having a switch operable between closed and open positions to initiate activation and deactivation of the load, comprising:
   a driver circuit for providing one of power and ground to the load;
   a sense circuit connected between the load and the driver circuit for providing a first signal condition when the switch is closed and a second signal condition when the switch is open;
   a timer for measuring the duration of the closed switch signal condition from the sense circuit; and
   a controller for activating the driver circuit in response to a closed switch signal condition from the sense circuit and deactivating the driver circuit in response to one of a measured closed switch signal condition in excess of a predetermined duration and an open switch signal condition from the sense circuit.

4. The electrical control circuit of claim 3 wherein the driver circuit includes a driver and an electrical switch.

5. The electrical control circuit of claim 4 wherein the electrical switch is a field effect transistor.

6. An electrical control circuit for an enclosed module having a load and a switch operable between closed and open positions to activate and deactivate the load, comprising:
   a driver circuit for providing one of power and ground to the load;
   a sense circuit tapped between the load and the driver circuit for providing a signal indicating one of a closed switch and an open switch;
   a controller for activating the driver circuit in response to a closed switch signal from the sense circuit; and
   a timer for measuring the duration of driver circuit activation;
   the controller deactivating the driver circuit in response to one of a measured driver circuit activation of a predetermined duration and an open switch signal from the sense circuit.

7. The electrical control circuit of claim 6 wherein the driver circuit includes a driver and an electrical switch.

8. The electrical control circuit of claim 7 wherein the electrical switch is a field effect transistor.

9. An automotive lamp control circuit comprising:
   a lamp having an ON/OFF switch;
   a battery;
   a driver circuit connected in series with the lamp and battery to control power application to the lamp;
   a controller connected to the driver circuit and programmed to normally turn the driver circuit OFF to deactivate the lamp;
   a sense circuit connected between a low voltage source and the lamp to generate a sense signal whenever the lamp switch is ON;
   the controller having a first input connected to receive the sense signal and being responsive thereto to activate the driver circuit; and
   a remote switch circuit for providing a low-level current through the lamp independent of the lamp switch, said controller having a second input connected to the remote switch circuit and being programmed to activate the driver circuit whenever the low-level current appears.

10. The circuit of claim 9 further including a timer to deactivate the driver circuit after a predetermined period of continuous activation.

11. An automotive lamp control circuit comprising:
    a lamp;
    an ON/OFF switch in series with the lamp to initiate activation and deactivation thereof;
    a low-power circuit to supply low current to the lamp when the ON/OFF switch is in the ON position;
    a sense circuit to sense low current flow in the lamp and to produce a high output condition in response to such low current flow;
    an FET circuit to apply high current to the lamp when turned ON; and
    a controller to receive the high output condition from the sense circuit and to turn the FET ON.

12. The automotive lamp control circuit of claims 11 further including a door ajar switch having ON and OFF conditions connected to supply power to the lamp in the ON condition independently of the position of the ON/OFF switch.

13. The automotive lamp control circuit of claim 11 further including a timer to turn the FET OFF after a predetermined period of ON time.

* * * * *